July 7, 1931.  J. E. JOHNSON  1,813,495
DEVICE FOR RECORDING SALES TRANSACTIONS
Filed Jan. 6, 1927  2 Sheets-Sheet 1
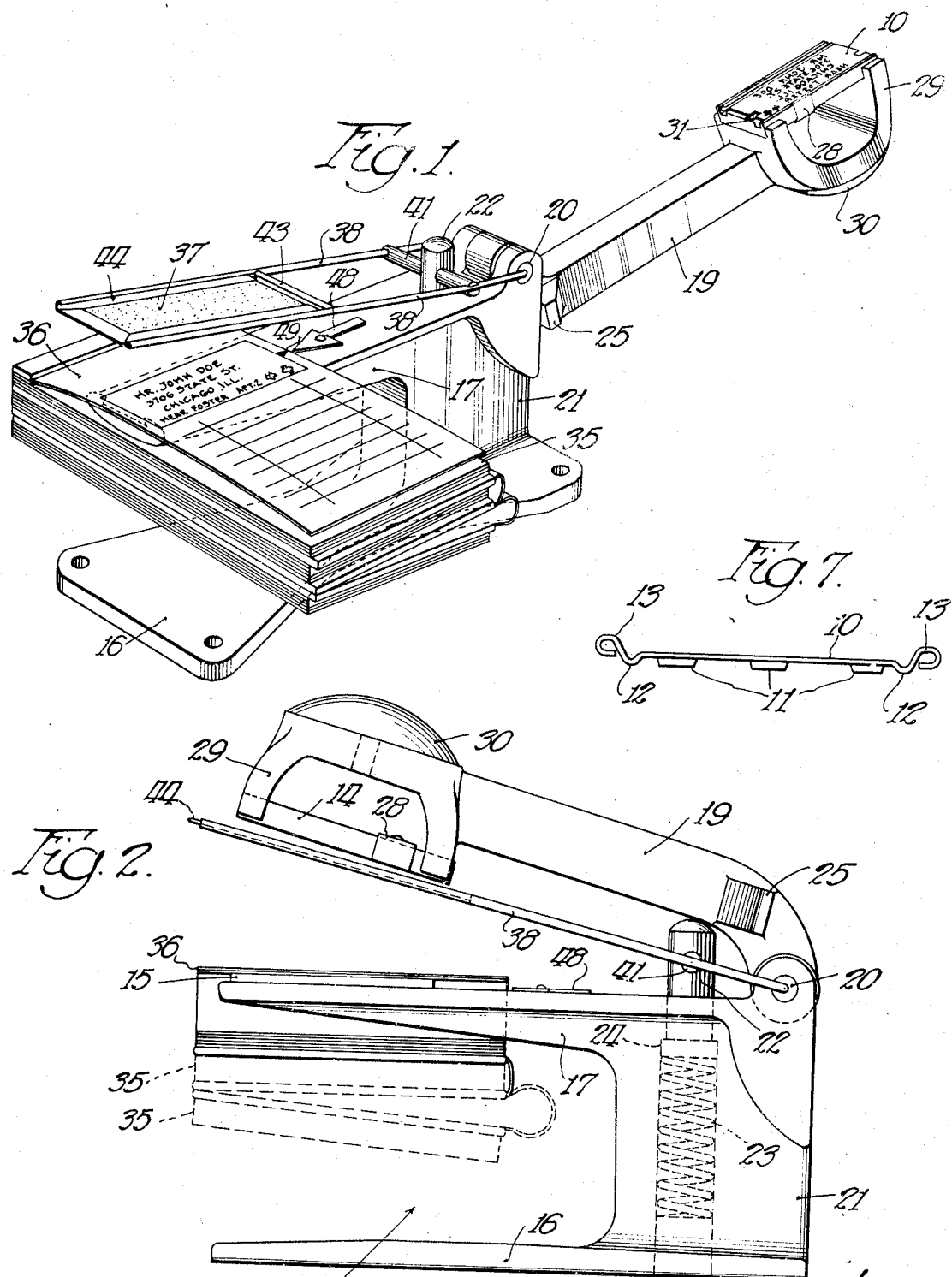
Inventor
John E. Johnson
by Emery, Booth, Janney & Varney Attys.

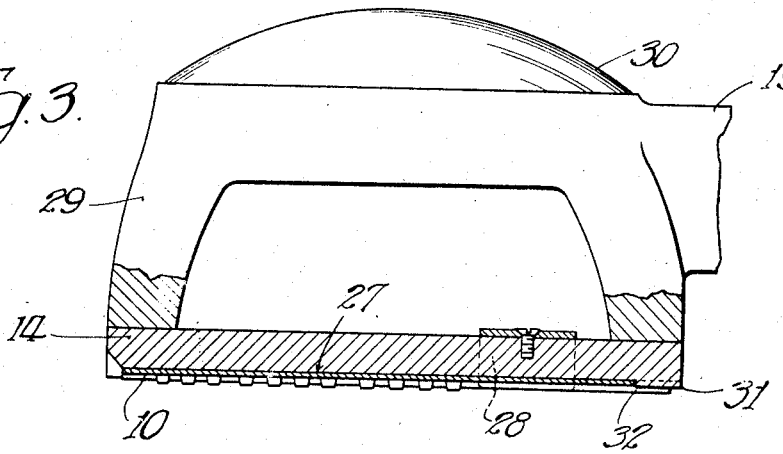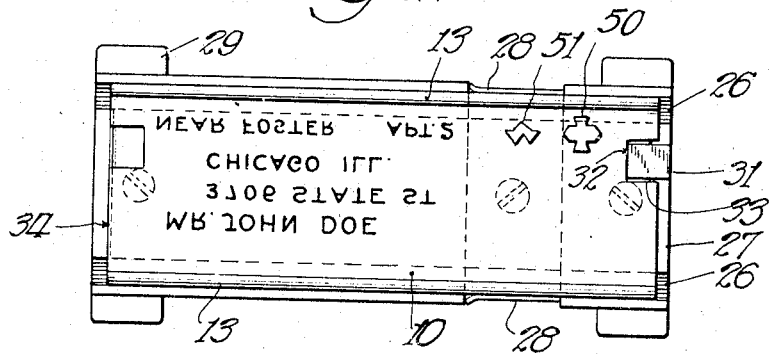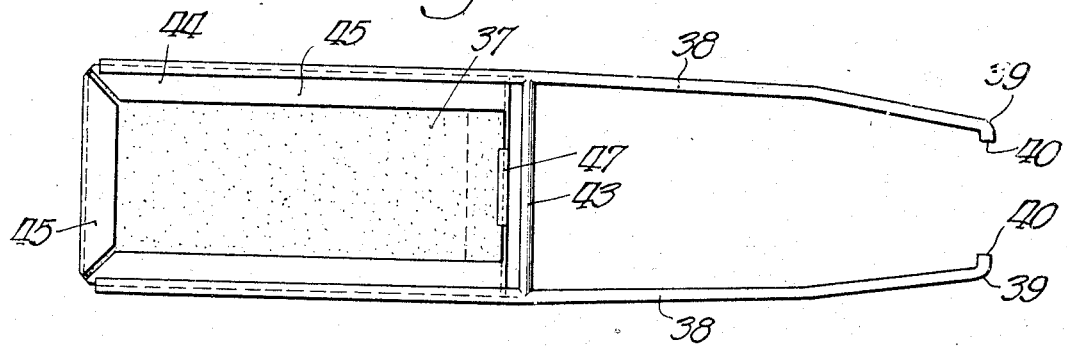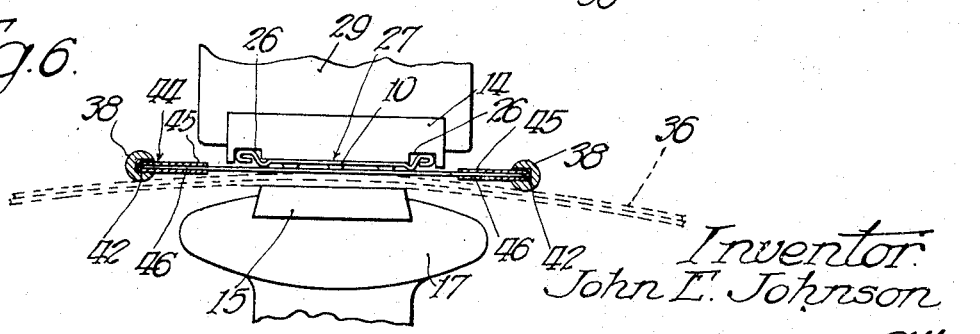

Patented July 7, 1931

1,813,495

UNITED STATES PATENT OFFICE

JOHN E. JOHNSON, OF CHICAGO, ILLINOIS, ASSIGNOR TO SPEEDAUMAT MANUFACTURING COMPANY, OF CHICAGO, ILLINOIS, A CORPORATION OF DELAWARE

DEVICE FOR RECORDING SALES TRANSACTIONS

Application filed January 6, 1927. Serial No. 159,347.

This invention relates to business transactions which involve the making of records or the like containing specific data relating, for example, to an individual involved in the transaction; and aims to provide improved means for expediting and increasing the reliability and accuracy of such transactions.

The invention may be readily understood by reference to one exemplification thereof as applied to retail merchandising and recording of retail sales transactions. Such exemplification of the invention is illustrated in the accompanying drawings.

In said drawings:

Fig. 1 is a perspective view of an imprinting device (with printing head thrown back) having associated therewith one form of sales record for receiving data involved in a sales transaction.

Fig. 2 is a sectional elevation of the construction shown in Fig. 1 but with the printing head moved into the position it occupies just prior to the printing operation.

Fig. 3 is a longitudinal section through the printing head holding a printing plate or token.

Fig. 4 is a bottom plan view of the construction shown in Fig. 3 and showing clearly a device for assisting the correct position of the imprinting element in the printing head.

Fig. 5 is a plan view of the ink supply or printing medium and the device which moves the former into and out of printing position.

Fig. 6 is a fragmentary end view of the apparatus with the respective parts in the positions they occupy at the time of the printing operation.

Fig. 7 is an enlarged end elevation of the illustrative form of sales token or printing plate.

In the present embodiment of the invention, the physical instrumentalities employed cooperate to record upon a sales record in an invariably legible form, certain data specific to the customer, such as, for example, the customer's name, address, credit rating, etc. These cooperating instrumentalities comprise a plate or token of size and shape convenient to be carried by the customer and bearing in legibly embossed characters the customer's name, adress, etc.; a sales record upon which the customer-data may be imprinted by the embossed characters on the token on as many copies as may be desired; and a device for associating the sales record and token whereby the data may be conveniently, legibly and accurately recorded on the sales record.

The present embodiment of the invention avoids direct contact of the customer-token with the ink or other imprinting medium, whereby the token may be returned to the customer in unsoiled condition and the possibility of soiling the customer's hands or gloves may be avoided.

The customer-carried token or imprinting element comprises in this instance a plate 10 of metal sufficiently ductile and malleable that it may be embossed (and re-embossed if need be to correct errors or to make changes) to provide in relief, clear and sharp printing characters 11, that is, characters which will print clearly and sharply. The obverse or intaglio side of the plate exhibits the characters in normal order so that the data may easily be read.

The long sides of the plate or token carry reinforcement in the form of longitudinal ribs 12 and marginal finishing beads 13, the latter serving also to provide the plate with smooth rounded edges. The side edges of the plate being smooth, round, and free from sharp projections or indentations, wear upon the purse, pocket or clothing of the customer is minimized so that the plate lends itself to convenient handling,—thereby preventing any reluctance on the part of customers to develop the habit of carrying the plate and using it in making purchases. The marginal reinforcement prevents bending of the relatively soft metal of the plate by much handling and preserves it in the flat condition desirable when the plate is used to print upon a record. In this connection the embossed surface of the plate also supplies a certain longitudinal and transverse reinforcement against bending. The beads 12 extend approximately into the plane of the top surface of the embossed characters 11, thereby minimizing the wear on the faces of the characters to which they are subjected in the normal carrying and handling of the plate. The foregoing structural features adapt the plate to be continuously carried by a customer without damage or impairment of function as a printing plate.

The illustrative device for operatively associating the token and sales record comprises a releasable token holder 14 and a platen 15 (in this instance advantageously formed of a slightly resilient material such as composition fiber or hard rubber) held in elevated position above the base 16 of the device by a supporting arm 17 to provide a space 18 to receive the idle portions of the sales book or books (in this case separate cash, charge and C. O. D. sales books comprise a unit—see Figs. 1 and 2),—whereby the sheet or sheets upon which a given record is to be made can be isolated from the balance of the record or record book and supported in an invariable position relative to the printing token at the time of the actual imprinting. By isolating from the balance of sales book or records those sheets which are to receive the impression, the legibility of the printed matter is not affected or influenced by the thickness of the sales book or reductions in thickness thereof through removal of used sheets; nor is such legibility affected by inequalities in the resilience or cushioning effect of a thick pile of records. In other words, the isolated sheets supported by platen 15 present a surface which is perfectly uniform as regards the amount of give or yield under the printing pressure of the token, and as compared with printing upon a thick pile of sheets in which inequalities are cumulative and which would yield more readily in one spot than another, resulting in a printed impression which would be correspondingly faint or illegible in spots.

In this instance, the relative movement between the platen 15 and holder 14 is effected by movably supporting the holder on an arm hinged at 20 to the standard 21. The arm 19 is normally yieldingly held in an appropriately elevated condition (see Fig. 2) by a resilient device in the form of a plunger 22 (elevated by spring 23) inside standard 21. A stop collar 24 limits the upward travel of the plunger. The pressure of plunger 22 while sufficient to elevate arm 19 offers no considerable resistance when the arm is operated to imprint the token on the record. The arm 19 may, if desired, be completely inverted by swinging around pivot 20 so as to bring the token holder face up, thereby placing it in a convenient position to receive a token (see Fig. 1). In such case the engagement of stop 25 with the standard holds the arm in approximately a horizontal position.

The printing plate or token holder 14 comprises in this instance a foundation or platen plate longitudinally grooved at 26 to receive the edge beading 13 of the printing token and having a flat middle area 27 which directly backs the area of the token bearing the embossed characters. The token is releasably held in and against the holder, in this instance by spring fingers 28 lying along a part of the grooves 26 and engaging the side edges of the plate. The surface 27 of the token holder 14 is so adjusted that it will bring the printing surface of a token into exact parallelism with the platen 15 when such surface is spaced therefrom a distance equal to the aggregate thickness of the record and other sheets supported on the platen (see Fig. 6). This arrangement results in uniformity of the printed matter at all points and avoids any faint or illegible areas which result from a lack of such parallelism.

The holder 14 is appropriately carried in a recess in the head 29 formed at the extremity of arm 19. At the upper side of the head a striking pad 30 of hardened rubber or fiber is advantageously provided.

The present holder is arranged advantageously to assist in the insertion of the printing plate therein in correct position, that is, with the embossed characters out. The height of the embossed characters 11 is such that if placed in contact with the backing surface 27 they would hold the beaded edges 13 sufficiently far out of the holder to lie beyond the grasp of the spring fingers 28, and the plate would, therefore, not be caught in the holder. In other words, the plate will only enter the holder when its intaglio side (that side which exhibits the characters in their normal arrangement) is in engagement with the surface 27 of the holder. Further to assist in the correct placing of the token in the holder, the latter is provided with a projection or lug 31 whose front face 32 acts as a stop and will not allow a token to be pushed entirely into the holder unless the embossed characters occupy a definite position relative to the holder. For example, in the present device unless the characters occur in upright position as the token is viewed from its intaglio side by the operator standing in front of the imprinting device as it is placed in Fig. 2, the plate cannot be pushed entirely into the holder. When in proper position as thus defined, the projecting lug 31 enters notch 33 at one end of the plate. If the plate be inadvertently reversed, its incorrect position would be observed by the sales person when the engagement of the straight edge 34 of the plate with the face 32 retarded the insertion of the plate leaving a portion thereof projecting from the holder.

The plates are conveniently provided at their other ends with notches opposite and corresponding to notches 33 (see Fig. 4), whereby the plates may be conveniently held in stacks in galleys or racks for storage or prior to embossing. Such galleys or racks may be associated with the embossing machines into which the plates are fed successively to receive the desired data.

The illustrative sales record comprises in this instance a book 35 containing a plurality (fifty, for example) of groups 36 of record sheets,—the number of sheets in each group may vary depending on the number of copies desired of the record of a given sales transaction. In the present instance, each group of record sheets comprises a detachable original sheet, two similar detachable copy sheets and a non-detachable record sheet (intended to remain in the book) which in the present case is a translucent tissue sheet. Duplication of the recorded data is effected on the various copy sheets by carbon sheets secured at their upper ends in the same pad with the record sheets. In use the carbon sheets are interleaved with the copy sheets of a given group, whereby a simultaneous record may be made on all copies.

The means for preventing direct contact of the printing token with the ink supplying or printing medium is herein embodied in the means which automatically carry the printing medium into printing position at the time of the printing operation. At other times the printing medium is advantageously withdrawn to permit the convenient positioning and removal of the sales records. The printing medium is supplied in this case from an inked sheet 37 (for example, carbon paper), the upper surface (uninked) of which serves to prevent the aforesaid direct contact of the token with the ink or other printing substance. The printing medium is carried into and out of printing position, in this instance by supporting arms 38 pivoted at 20 coaxially with arm 19. The arms 38 are conveniently made of appropriately stiff wire or rods, the ends of which are bent at 39 to provide pivots 40 which enter appropriate openings in the pivot pin 20. Intermediate their ends, arms 38 are operatively connected to plunger 22 by a pin 41 passing through the plunger and having forked ends which embrace the respective arms 38. In idle position plunger 22 holds the inking sheet 37 a substantial distance above platen 15 whereby the sales records may readily be removed or located in proper position on the platen. The downward movement of plunger 22 under pressure of arm 19 carries the printing medium into printing position above the sales record. Thus the sales record is always visible save only during the instant when the printing arm 19 is struck to imprint the data upon the record, the printing medium being withdrawn, in this case, simultaneously with the printing head.

The sheet 37 is advantageously made removable so that it may be reversed or shifted slightly to increase its life or replaced by a fresh sheet. In the present device this is effected by carrying the sheet between grooves 42 in the respective arms 38. A spacer bar 43 connects and holds the grooved arms separated by the proper distance. The inking sheet may, as in the present case, be carried in a frame 44 to hold the sheet smooth and to lend desirable support thereto. In such cases the frame is designed to slide between and be frictionally held in the grooves 42. For this purpose, the arms 38 may be arranged so that they tend to spring together sufficiently to exert a resilient pressure upon the sides of the frame. The frame in the present case is made of sheet metal, the longitudinal margins and one end margin of which are folded over as at 45 to provide deep grooves 46 with yielding sides which resiliently grip the margins of the inked sheet. A portion of the edge at one end of the frame is turned over as at 47 to lie over the end of the inked sheet to prevent the accidental removal or partial removal of the sheet. These frames permit a convenient removal of inked sheets. In practice a number of frames with fresh sheets are supplied to each printing device so that a fresh sheet may be easily and quickly installed simply by the insertion of a frame carrying a fresh sheet. Later the worn or used sheets may be removed from the idle frames and replaced by fresh sheets.

The records may be conveniently and accurately centered on the platen 15 with the aid of appropriate guides. In this instance a guide in the form of an arrow 48 is adjusted on the platen supporting arm 17 so that the alignment or register of the arrow point with a mark or line 49 at the edge of the sales record will serve to center the sales record relative to the data on the token. This assures the alignment of the data printed from the token with the various legends as "Address," "City," etc., placed along the margins of the sales record.

While the installation of the above described system whether for retail merchandising or for recording other transactions does not preclude the making of purchases and recording of sales or other transactions (in the same sales books) without the use of the individual printing plate or token, the advantages both to the individual and to the organization employing the system resulting from the habitual use of the plate or token, are so great that the individuals will inevitably fully cooperate with the organization to effect the general and systematic use of the plates or tokens. From the standpoint of a retail customer, for example, whose effective cooperation requires the carrying and use of such a token whenever purchases are made, the speed of completing a given transaction at once impresses the customer. Furthermore, the errors, delays and failures in delivery are avoided as well as erroneous debits on the customer's charge account due to illegible or erroneous data on the sales record. Since the token is always returned to the customer in unsoiled condition, the latter is not reluctant to carry and use it regularly.

From the standpoint of the organization such as a department store, the speed in completing a given sales transaction obviously is highly advantageous because a given sales person can complete a greater number of sales transactions. Whenever the volume of sales made by a sales person is reflected in the sales person's earnings obviously the sales person becomes directly interested in extending the use of the customer carried token. The outstanding advantage to the department store is, however, the avoidance of loss through illegible or erroneous data on the sales record. Loss from this source is wholly avoided by the use of such tokens.

A single token is capable of use in making purchases at a number of establishments. In such cases each establishment may emboss on the taken an individual, private symbol 50 which may serve to indicate the credit rating of the customer. Other establishments when extending credit to a customer already supplied elsewhere with a token, may simply emboss the individual credit symbol 51 of that establishment. Such symbol on the token may serve, if the management of a store so desire, to indicate to the sales person (who is familiar with the significance of the store's private symbols) the fact that certain credit has been extended to the customer to whom the token has been issued. On the other hand, a given establishment may not extend such significance to its symbols and may, on occasion, require proof of the purchaser's identity, etc., in the usual manner or that the sale be approved by an official, regardless of the possession by the customer of a token.

Obviously the invention is not limited to the details of the exemplification thereof herein illustrated and described, since such details may be variously modified. Moreover, it is not indispensable that all features of the inventions be used conjointly, since various features may be advantageously employed (without others) in different practices and combinations.

Having described one embodiment of my invention, I claim:

1. In a device for printing upon sales records or the like, the combination comprising a sheet having a printing medium thereon, a frame for holding said sheet, said frame having grooved sides for removably holding said sheet whereby said frame may be supplied with a fresh sheet when necessary, and means on said device for removably holding said frame.

2. In a device for printing upon sales records or the like the combination comprising a sheet having a printing medium thereon, a frame for holding said sheet, said frame being composed of sheet metal folded over along the sides to provide channels with resilient sides for receiving and resiliently holding said sheet, whereby said sheet may be replaced in said frame when necessary, and means on said device for removably holding said frame.

3. In an instrumentality of the character described, the combination comprising an individually carried token having embossed thereon in printing characters the name of the individual, a printing device for releasably holding said token during the operation of imprinting the same on a record, and means for avoiding the improper insertion of said token in the holding means.

4. In an instrumentality of the character described, the combination comprising a customer carried token having embossed thereon in printing characters the name of the customer, and a printing device for releasably holding said token during the operation of imprinting the same on said record, said holding means being constructed and arranged to prevent reception of said token in an inverted position.

5. In a device of the character described the combination comprising, a customer carried token bearing thereon in printing characters customer data including the name of the customer, a printing device having a holder for releasably holding said token for imprinting the same upon a record sheet in a sales book and having a platen for supporting said record during such imprinting, said platen being carried on said printing device in a position to provide a space on its opposite side for receiving the idle sheets of said sales book, whereby the record sheet to be imprinted upon may be isolated from the other sheets of said book and the imprinting operation may be effected independently of the thickness or variation in thickness of said sales book.

6. In an instrumentality of the character described, the combination comprising an individually carried token having embossed thereon in printing characters the name of the individual, a printing device for releasably holding said token during the operation of imprinting the same on a record, and means for indicating the improper insertion of said token in said holding means.

7. In an instrumentality of the character described, the combination comprising an individually carried token having embossed thereon in printing characters the name of the individual, a printing device for releasably holding said token during the operation of imprinting the same on a record, and a projection associated with said holding means to prevent the improper insertion of said token in said holding means.

8. In an instrumentality of the character described, the combination comprising an individually carried token having embossed thereon in printing characters the name of the individual, a printing device for releasably holding said token during the operation of imprinting the same on a record, and a projection associated with said holding means and arranged to enter a registering recess in said token only when the latter is inserted in correct position in said holding means, whereby said plate cannot be improperly inserted in said holding means.

9. In apparatus for recording sales transactions with the use of customer carried printing tokens, the combination comprising a sheet corresponding in size to the printing token and having a printing medium only on one side thereof, a frame for holding said sheet, an impression device for holding a token, and means for removably holding said frame and sheet in operative relation to said impression device, said frame being so disposed in said holding means that the face of the sheet without the printing medium is disposed toward the printing taken in the impression device, whereby the token does not become soiled with printing medium during its use and may be returned unsoiled to the customer.

10. In a device of the character described the combination comprising a customer carried token bearing thereon in printing characters customer data including the name of the customer, and a printing device having a holder for releasably holding said token for imprinting the same upon a sales record and having a platen whose area is not substantially greater than said token for supporting a sales record during such imprinting, said platen having guide means associated therewith to enable the sales record to be located thereon in position to receive the impression of the token in a predetermined place on the record, and means associated with said holder for indicating when the token is placed in the holder in a reversed position such as would invert the impression on the sales record.

11. In a device of the character described the combination comprising a customer carried token bearing thereon in printing characters customer data including the name of the customer, a horizontal platen for supporting a sales record to be imprinted upon, a holder for releasably holding a token on its under face, means including a swinging arm carrying said holder and connected to said platen for enabling said holder to be moved to imprint a token on the sales record, said means adapted to permit said arm to be thrown back to invert said holder so that the printing face of the token will be visible when it is inserted in said holder, and guide means associated with said platen to enable the sales record to be located on said platen in position to receive the impression in a predetermined place on the record.

12. Means for recording sales transactions comprising in combination a customer carried token bearing thereon in printing characters data specific to the customer, a platen for supporting a group of sales sheets face up and arranged to permit said sheets to be isolated from other sheets in a sales book so that the thickness of the sheets supported on the platen will be uniform and independent of variations in thickness of the sales book, a printing device associated with said platen for releasably holding a token and movable to imprint said token on said sales sheets, said printing device being arranged relative to said platen and the thickness of the sheets to be imprinted upon to bring said token into parallelism with said platen upon contact with the record sheets, means for supplying a printing medium by which said data may be reproduced on said sales sheets, said means being arranged to avoid direct contact of the token with the printing medium, whereby the token may be returned to the customer unsoiled by the printing medium.

13. In apparatus of the character described the combination comprising a record, a printing device having a platen for supporting said record, an individual printing plate having thereon in printing characters data to be imprinted upon said record, means on said printing device for removably holding said printing plate and operating the latter to print upon the record supported on said platen, a sheet having a printing medium thereon for printing upon said record, and means on said device for removably holding said sheet, whereby the latter may be replaced by a fresh sheet.

14. As an article of manufacture for apparatus for recording sales transactions with the use of customer carried printing tokens, a removable frame of a size corresponding to the size of the token and having secured therein a sheet having a printing medium on only one face thereof so that said sheet may be engaged by the token without soiling the latter with printing medium.

15. In a device of the character described the combination comprising a customer carried token bearing thereon in printing characters customer data including the name of the customer, a printing device having a holder for releasably holding said token for imprinting the same upon a sales record and having a platen for supporting a sales record during such imprinting, and means for supplying a printing medium, said platen being carried on said printing device in a position to provide a space on its opposite side for receiving the idle sheets of a sales book carrying a plurality of sales records, whereby the record sheet to be imprinted upon may be isolated from the other sheets of said book and the imprinting operation may be effected independently of the thickness or variation in thickness of said sales book.

16. In a device of the character described the combination comprising a customer carried token bearing thereon in printing characters customer data including the name of the customer, imprinting means including a base, a platen for a sales record supported by and above said base a distance to provide a space thereunder to receive a group of idle sales records so that the idle sales records may be isolated from the sales record to be imprinted upon, a holder for releasably holding a token, means for supplying inking medium automatically movable into and out of printing position and constructed and arranged to protect the token from contact with ink, and means for movably supporting said holder on said base so that said holder may be moved to imprint the token carried thereby upon a sales record supported on said platen and for raising said holder to permit access to said sales record and the removal of said token.

17. Means for recording sales transactions comprising in combination a customer carried token bearing thereon in printing characters data specific to the customer, a platen for supporting a group of sales sheets face up and arranged to permit said sheets to be isolated from other sheets in a sales book so that the thickness of the sheets supported on the platen will be uniform and independent of variations in thickness of the sales book, a swinging printing device associated with said platen for releasably holding a token and movable to imprint said token on said sales sheets, said printing device being arranged relative to said platen and the thickness of the sheets to be imprinted upon to bring said token into parallelism with said platen upon contact with the record sheets, means for supplying a printing medium by which said data may be reproduced on said sales sheets, said means being arranged to avoid direct contact of the token with the printing medium, said printing device being constructed and arranged to be movable a substantial distance away from printing medium supply means, whereby the token may be readily inserted in and removed from said printing device and may be inspected by the operator after insertion therein without interference from said printing medium supply means, and may be returned to the customer unsoiled by the printing medium.

18. Means for recording sales transactions comprising in combination a customer carried token bearing thereon in printing characters data specific to the customer, a platen for supporting a group of sales sheets face up and arranged to permit said sheets to be isolated from other sheets in a sales book so that the thickness of the sheets supported on the platen will be uniform and independent of variations in thickness of the sales book, a swinging printing device associated with said platen for releasably holding a token and movable to imprint said token on said sales sheets, said printing device being arranged relative to said platen and the thickness of the sheets to be imprinted upon to bring said token into parallelism with said platen upon contact with the record sheets from a position out of parallelism therewith where the token is inserted in and removed from said printing device, means for supplying a printing medium by which said data may be reproduced on said sales sheets, said means being arranged to avoid direct contact of the token with the printing medium, whereby the token may be returned to the customer unsoiled by the printing medium.

19. In a device of the character described the combination comprising a customer carried token bearing thereon in printing characters customer data including the name of the customer, a swinging arm having a holder for releasably holding said token, a horizontal platen for supporting a sales record sheet and raised a distance above its supporting base to provide a space below the platen for the insertion of a book holding the sales records whereby the record to be printed upon may be isolated from the sales book, said swinging arm being constructed and arranged to be thrown back to expose the platen and to bring the printing characters of said token parallel to the record on said platen at the time of impression, and guide means associated with said platen to enable the sales record to be located on said platen so that the impression made thereon by the token will occur in a predetermined place on the record.

20. In a device of the character described the combination comprising a customer carried token bearing thereon in printing characters customer data including the name of the customer, and a printing device having a holder for releasably holding said token for imprinting the same upon a sales record and having a platen for supporting a sales record during such imprinting, said platen being carried on said printing device in a position to provide a space on its opposite side for receiving the idle sheets of a sales book carrying a plurality of sales records, whereby the record sheet to be imprinted upon may be isolated from the other sheets of said book and the imprinting operation may be effected independently of the thickness or variation in thickness of said sales book.

21. In a device of the character described the combination comprising a customer carried token bearing thereon in printing characters customer data including the name of the customer, imprinting means including a base, a platen for a sales record supported by and above said base a distance to provide a space thereunder to receive a group of idle sales records so that the idle sales records may be isolated from the sales record to be imprinted upon, a holder for releasably holding a token, and means for movably supporting said holder on said base so that said holder may be moved to imprint the token carried thereby upon a sales record supported on said platen and for raising said holder to permit access to said sales record and the removal of said token.

22. In a device of the character described the combination comprising a customer carried token bearing thereon in printing characters customer data including the name of the customer, imprinting means including a base, a platen whose area is not substantially greater than that of a token supported by and above said base a distance to provide a space thereunder to receive a group of idle sales records so that the idle sales records may be isolated from the sales record to be imprinted upon, a holder for releasably holding a token, and means for movably supporting said holder on said base so that said holder may be moved to imprint the token carried thereby upon a sales record supported on said platen and for raising said holder to permit access to said sales record and the removal of said token.

23. A device for printing upon sales records or the like comprising in combination, an impression head, a support for the sales record to be imprinted upon, a sheet having a printing medium thereon and provided along its side margins with stiffening means to hold the same in extended position, and holding means associated with said impression head having longitudinal grooves therein for removably holding said sheet whereby a fresh sheet may be inserted therein.

24. A device for printing upon sales records or the like comprising in combination an impression head adapted to receive a printing token, a support for the sales record to be imprinted upon, a sheet corresponding in size to the printing token and having a printing medium only on one side thereof, grooved holding means associated with said impression head for removably holding a sheet in operative relation thereto, and means along the side margins of said sheet for holding said margins in extended position and enabling said sheet to be readily inserted in said holding means, said sheet being so disposed in said holding means that the face of the sheet without the printing medium is disposed toward the printing token in the impression head, whereby the token is isolated from contact with the printing medium and may be preserved in unsoiled condition.

25. In a device of the character described the combination comprising a customer carried token bearing thereon in printing characters customer data including the name of the customer, and a printing device having a holder for releasably holding said token for imprinting the same upon a sales record and having a platen projecting therefrom a distance above the base thereof for supporting a sales record during such imprinting, said platen being adapted to be inserted under the sales record to be imprinted to isolate said sales record from the other sheets of the sales book, whereby the cushioning effect of said other sheets in the imprinting operation is eliminated.

26. In a device of the character described the combination comprising a customer carried token bearing thereon in printing characters customer data including the name of the customer, a printing device having a holder for releasably holding said token for imprinting the same upon a sales record, a renewable printing medium associated with said holder to supply printing ink and having its surface next to the holder free from ink to protect the token from contact with ink, and a platen corresponding in size to the area of said token projecting from and a distance above said printing device and constructed and arranged to be inserted under a group of sales records to be imprinted upon to isolate said records from the records not imprinted upon.

27. In apparatus of the character described, the combination comprising a printing device including an impression head removably carrying a printing plate for printing data on a sales record, a sheet having a printing medium thereon for printing upon said record, means for protecting the printing plate against soiling by the printing medium, and supporting means for said sheet independent of said impression head to carry said sheet into printing position at the time of the printing operation.

In testimony whereof, I have signed my name to this specification.

JOHN E. JOHNSON.